United States Patent
Roess

[11] 3,865,528
[45] Feb. 11, 1975

[54] EXTRUSION APPARATUS HAVING ELECTRONIC INTERPOLATOR

[75] Inventor: Louis G. Roess, Aurora, N.Y.
[73] Assignee: Moog Inc., East Aurora, N.Y.
[22] Filed: Nov. 1, 1973
[21] Appl. No.: 411,830

[52] U.S. Cl.................. 425/145, 425/166, 425/381, 425/466
[51] Int. Cl............................................ B29d 23/04
[58] Field of Search................. 264/40; 235/151.11; 425/376, 162, 166, 167, 141, 381, 145, 147, 140, 150, 380, 465, 466, 461, 308

[56] References Cited
UNITED STATES PATENTS

| | | | |
|---|---|---|---|
| 3,218,672 | 11/1965 | Langecker | 425/381 |
| 3,262,152 | 7/1966 | Fogelberg et al. | 425/308 X |
| 3,368,241 | 2/1968 | Williams | 425/466 X |
| 3,538,548 | 11/1970 | Tenner | 425/141 |
| 3,712,772 | 1/1973 | Hunkar | 425/141 |

Primary Examiner—R. Spencer Annear
Assistant Examiner—Mark Rosenbaum

[57] ABSTRACT

The improvement in cyclically operated extrusion apparatus of providing electronic interpolator means responsive to different portions of the total range of a continuously variable signal which is provided during each cycle of operation, programmable means for selecting portions of the interpolator output signals, means for summing such programmed output signals to provide a command signal for servocontroller means which effects relative movement between a die head and pintle to provide a variable orifice through which extrudable material is forced to form a parison of controlled wall thickness. Variations of the broad concept contemplate generating the continuously variable signal by an electrical transducer machine slaved to some movable element of the apparatus, or by a ramp generator which may have an electromechanical integrator or an electronic integrator. More specific features include the capability of selecting two or more programs, serviced by a single electronic interpolator means, for simultaneous control of a corresponding number of separate functions.

19 Claims, 16 Drawing Figures

EXTRUSION APPARATUS HAVING ELECTRONIC INTERPOLATOR

BACKGROUND OF THE INVENTION

A. Field of the Invention

The present invention relates to that type of extrusion apparatus which forms a parison of controlled wall thickness for use in the blow molding art.

B. Description of the Prior Art

It is known in extrusion apparatus of the type utilized to provide a parison of controlled wall thickness to have a pintle or mandrel movable relative to a die head to provide a variable orifice through which a fluidized thermoplastic material is forced to form the parison.

One prior art technique employed a machine-driven cam with a cam follower to position a pintle or mandrel, and is illustrated, for example, in U.S. Pat. No. 3,262,152. This was a costly arrangement and was cumbersome to change the program, involving difficulty to attach the cam drive to the extrusion machine.

Another prior art technique employed a rotary selector switch for programming point-to-point variations in the movement of the pintle or mandrel, and is illustrated, for example, in U.S. Pats. No. 3,368,241 and No. 3,538,548. The disadvantage of this technique was that it did not provide continuous variations between programmed points, was limited by a practical number of switch positions, and the output from the selector switch had transients and discontinuities corresponding to switch positions.

Still another prior art technique was to provide a clock or time controlled servo for positioning the pintle or mandrel, having presettable commands for orifice opening versus time, the clock being regularly synchronized with the extrusion machine, and is illustrated, for example, in U.S. Pat. No. 3,712,772. However, with this system, the clock was only periodically synchronized to the machine which provided an open-loop type control which could not take into account such variables as screw speed change, machine hesitation, or change from cycle to cycle of operation due to other causes such as temperature variations and the plasticity of the extrudable material.

Yet another technique practiced in the prior art by the assignee to this application was to provide a continuously variable electrical rotary transducer which interpolated the programmed points on a matrix board, selectively set to determine a sequence of orifice openings. This arrangement was expensive, requiring a multitapped potentiometer having many wires in an electrical cable to the extrusion machine, had a limited life due to wear, and sometimes the potentiometer was difficult to locate on the extrusion apparatus because of its requirement for rotary motion.

SUMMARY OF THE INVENTION

The primary object of the present invention is to provide a parison programming system which overcomes the disadvantages and shortcomings of the aforementioned prior art techniques.

More specifically, the present invention provides an improved control of parison formation which allows the length of the parison to be controlled; which allows an increase in the number of program points in critical portions of the parison length such as in the region of the neck or the base of a bottle to be blown from the parison; which allows two or more programs to be set on the same matrix board for controlling different parison formations or asymmetrical formation of a single parison; which employs electronic means that are relatively inexpensive and not subject to wear as with relatively movable mechanical parts, and are versatile in adjustment to vary control conditions; and which is readily adaptable to a variety of extrusion machines.

These and other objects and advantages of the invention will be apparent from the ensuing detailed description of preferred embodiments, and are achieved by providing cyclically operated extrusion apparatus which forces extrudable material through a variable orifice to form a parison of selectively variable wall thickness throughout its length, in which apparatus servocontroller means responsive to an electrical command signal are provided for effecting relative movement between a die head and a pintle to determine the size of such variable orifice, such command signal being produced by the combination comprising means producing a continuously variable electrical signal during one cycle of operation, electronic interpolator means to provide a plurality of interpolator output electrical signals responsive to different portions of the total range of said variable signal, programmable means for selecting portions of said interpolator output signals to provide programmed output signals to provide said command signal.

DESCRIPTION OF PREFERRED EMBODIMENTS

FIGS. 1–5

Figure 1:
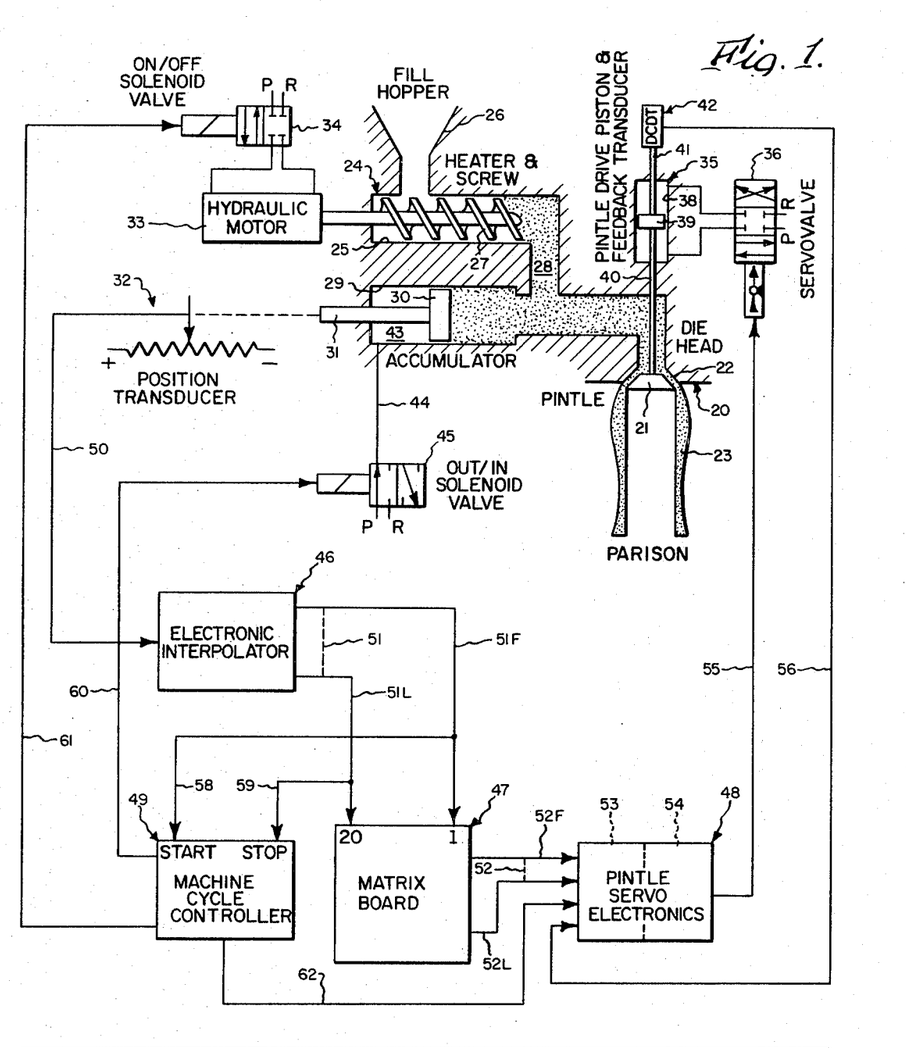
FIG. 1 is a schematic illustration of extrusion apparatus for forming a parison utilized in the blow molding art, and further showing one preferred embodiment of means essentially illustrated in block diagram form for controlling the apparatus in accordance with the principles of the present invention, this embodiment being characterized by being machine slaved to the movement of the accumulator piston of the extrusion apparatus.

The extrusion apparatus illustrated in FIG. 1 comprises a die head 20 on which a pintle or mandrel 21 is movably mounted to provide a variable orifice 22 through which a plasticized extrudable material is forced to form a parison 23. The parison is adapted to be confined in a separable blow mold (not shown) and injected with a pressurized gas such as compressed air by means (not shown) so as to expand the parison against the wall of the mold cavity and thereby form a molded material such as a bottle (not shown). The extrudable material may be any suitable thermoplastic such as polypropylene, polyethylene, and the like.

Accordingly, the apparatus further comprises a plasticizer, indicated generally at 24, including a heated chamber 25 into which adjacent its rear end solid plastic material in pellet form or the like is fed from a hopper 26. A rotary conveyor screw 27 is arranged in this chamber to force heat-softened flowable thermoplastic material through a passage 28 leading to orifice 22 and communicating with one end chamber of an accumulator cylinder 29 in which a piston 30 is slidably arranged. This piston has a rod 31 extending through the end wall of cylinder 29 and is operatively associated with a position transducer 32 of any suitable type, specifically shown as a potentiometer. Screw conveyor 27 is shown as driven by a rotary type hydraulic motor 33 of any suitable type, controlled by an on/off solenoid valve 34 of any suitable construction.

The position of pintle 21 relative to die head 20 is shown controlled by servocontroller means represented generally by the numeral 35. Such means preferably comprises a servoactuator combination including an electrohydraulic servovalve 36 of any suitable type, such as that shown in U.S. Pat. No. 3,023,782, which meters flow with respect to the end chambers of a cylinder 38 on opposite sides of a piston 39 movable longitudinally therein. On one side this piston has a rod 40 connected to pintle 21, and on its other side a rod 41 which extends through the end wall of cylinder 38 and is operatively associated with a position transducer 42 of any suitable type, illustrated as a direct current powered differential transformer, a DCDT.

The portion of the accumulator cylinder surrounding accumulator piston rod 31 provides an end chamber 43 serviced by a conduit represented by the line 44 leading to an out/in solenoid valve 45 of any suitable construction.

The various devices handling hydraulic fluid, such as servovalve 36 and solenoid valves 34 and 45, are severally connected to a suitable source of pressurized hydraulic fluid (not shown) but the port therefor on each such device is represented by P, and also are severally connected to a suitable sump or return for hydraulic fluid (not shown) but the port therefor on each such device is represented by R.

Still referring to FIG. 1, the means for providing a command signal for servovalve 36 is represented in this Figure by three assemblies, illustrated as boxes designated electronic interpolator, matrix board, and pintle servo electronics, and represented generally by the numerals 46, 47 and 48, respectively. Also shown is a machine cycle controller 49.

Interpolator 46 is shown as receiving an electrical input signal from transducer 32 via a conductor 50, and producing a plurality of output signals transmitted via conductors represented collectively by the broken line 51, including a first conductor 51F and a last conductor 51L. These conductors 51 such as 51F through 51L feed input signals into matrix board 47 which is selectively programmable to produce a series of programmed output electrical signals transmitted via conductors represented collectively by broken line 52, including a first conductor 52F and a last conductor 52L. These conductors 52 such as 52F through 52L feed programmed output electrical signals to the pintle servo electronics box 48 which includes a summing amplifier and a servoamplifier represented schematically by the numerals 53 and 54, respectively in FIG. 1. As shown in this Figure, the command signal for servovalve 36 is transmitted from electronics box 48 via a conductor 55, and the electrical feedback signal generated by position transducer 42 is transmitted to this electronics box via a conductor 56.

Machine cycle controller 49 is shown as receiving electrical input signals through conductors 58, 59 from conductors 51F and 51L, respectively. Output signals from this controller are transmitted via conductor 60 to solenoid valve 45, via conductor 61 to solenoid valve 34, and via conductor 62 to electronics box 48.

Figure 3:
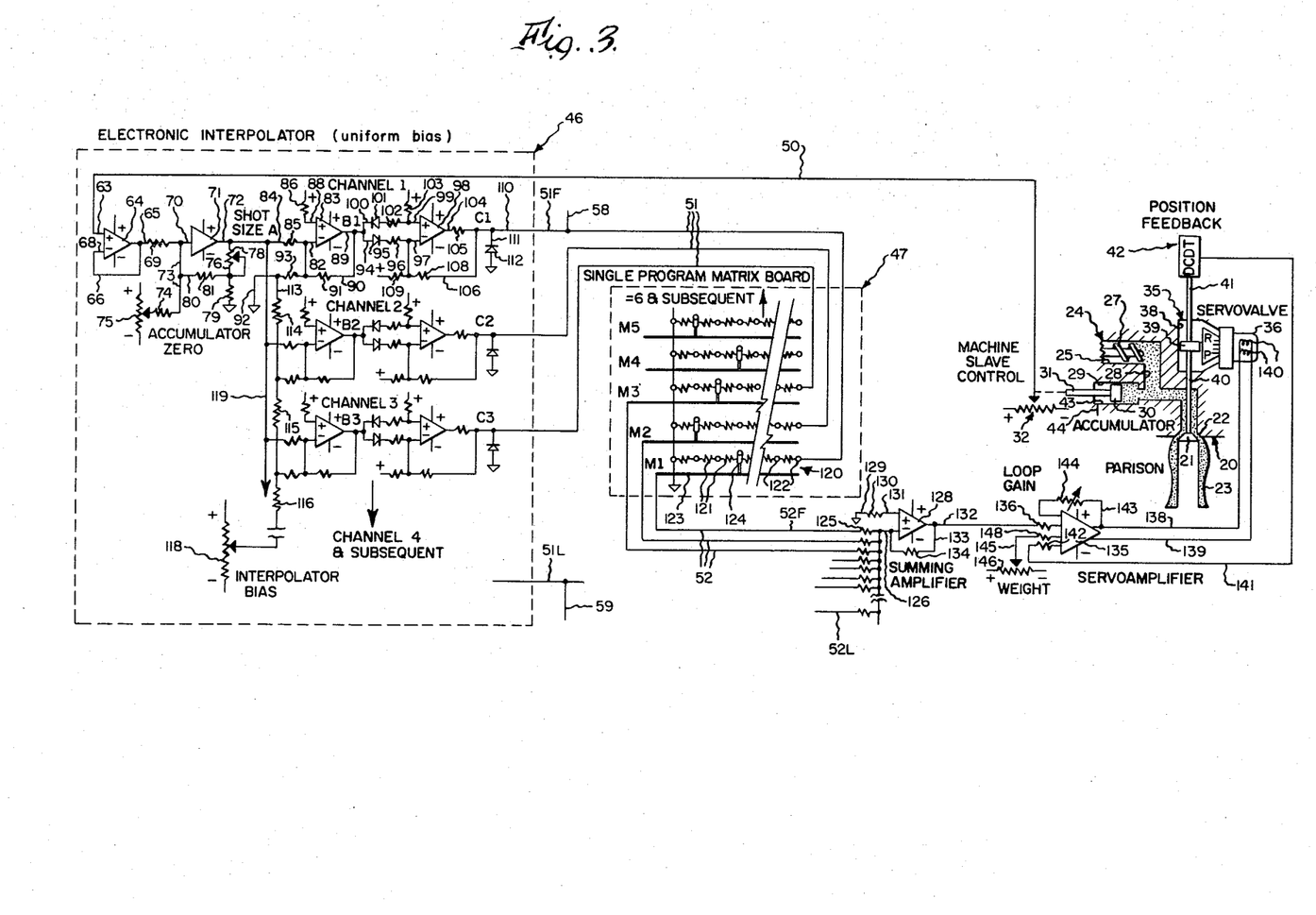
FIG. 3 is a circuit diagram of the electronic interpolator, matrix board and pintle servo electronics, shown in FIG. 1, in association with that portion of the extrusion apparatus which generates and utilizes the command signal for the servocontroller means, the electronic amplifiers of the interpolator having linearly distributed biases, and the matrix board having a single set of shorting bars for a single program.

Referring to FIG. 3, the electronic interpolator 46 is shown as comprising a number of integrated circuit operational amplifiers to provide a plurality of channels, designated Channel No. 1, Channel No. 2, and so on. The interpolator is driven by an electrical signal generated from a transducer attached to a convenient place to the machine cycle mechanism. This drive signal provides a signal at point A in the interpolator that varies continuously from the start to the end of one machine cycle, and is fed to each channel. These channels each comprises a biased amplifier producing signal outputs, designated B1, B2, and so on, and an absolute value amplifier producing signal outputs, designated C1, C2, and so on.

Bias is supplied by a resistor string. Each channel amplifier is biased-off negatively until the signal at point A reaches the bias level. When the signal at point A reaches the bias for Channel No. 1, the channel signal B1 follows the input signal, but at a much higher gain. The signal B1 will soon saturate at the maximum voltage available. The bias levels are arranged so that successive channels are "turned on" when the preceding channel has one-half maximum voltage output.

The second amplifier in each channel develops a signal, C1, C2, and so on, that has the absolute value of the input signal about the one-half maximum voltage level. This creates a series of successive and overlapping voltage pyramids which provide the supply for the various rows of the matrix board 47, as explained later herein.

With this brief outline of function in mind, the detailed circuitry of electronic interpolator will now be described.

Referring to FIG. 3, the electronic interpolator 46 is shown as driven by the electrical signal generated by transducer 32 and transmitted by conductor 50. This conductor is shown as connected to a high impedance input 63 of a first operational amplifier 64 which has an output conductor 65 connected through a feedback conductor 66 to a second input 68 for this amplifier. Output conductor 65 is shown as having a resistor 69 therein and is connected to the input 70 of an operational amplifier 71 having an output conductor 72. Input 70 is shown as being connected by a conductor 73 having a resistor 74 therein to a potentiometer 75. Output conductor 72 is shown as connected to ground via a conductor 76 having a variable resistor 78 and a resistor 79 therein in series. A feedback conductor 80 having a resistor 81 therein is shown as connecting conductor 76 between resistors 78 and 79 with conductor 73.

Thus, impedance buffer amplifier 64 and variable gain amplifier 71 provide a voltage at connection point A in conductor 72 which is responsive to the input signal from transducer 32 and subject to bias control by adjustment of potentiometer 75 to determine the start of the extrusion or rightward stroke of accumulator piston 30, referred to as accumulator zero, and also subject to gain control by adjustment of variable resistor 78 to determine the volume of plasticized material extruded in each cycle of operation, referred to as shot size.

As previously stated, the various channels, such as Channel No. 1, Channel No. 2, etc., are connected to point A so that the signal at this point is fed to each channel. The circuitry of each of these channels is the same, except for bias, and hence a description of Channel No. 1 hereinafter made is intended to apply equally to the other channels.

Point A is shown connected to an input 82 of a biased operational amplifier 83 by a conductor 84 having a resistor 85 therein. A bias resistor 86 is connected to another input 88 to this amplifier 83. An output conductor 89 of this amplifier 83 is shown as connected at point B1 to a feedback conductor 90 which at its other end is connected to input 82. Conductor 90 has a resistor 91 therein. A conductor 92 is connected at one end to conductor 90 between resistor 91 and input 82 and at its other end to ground, and is shown as having a resistor 93 therein.

Point B1 is shown as connected through an input component circuit including a conductor 94 having a diode 95 and a resistor 96 in series, to one input 97 of an absolute value operational amplifier 98, and to its other input 99 through an input component circuit including a conductor 100 having a diode 101 and resistor 102 in series. Conductor 100 is further shown as having a bias resistor 103 connected thereto between resistor 102 and amplifier input 99. Amplifier 98 is shown as having an output conductor 104 leading to a point C1 and has a resistor 105 therein. A feedback conductor 106 having a resistor 108 therein connects conductor 104 at point C1 to amplifier input 97. A bias resistor 109 is shown as connected to conductor 106 between resistor 108 and amplifier input 97. A conductor 110 is connected to point C1 and as it leaves interpolator 46 becomes conductor 51F. A conductor 111 is shown as connected to conductor 110 between point C1 and conductor 51F, leads to ground and has a diode 112 therein that serves as a clamping diode.

A conductor 113 having a plurality of bias resistors such as indicated at 114, 115 and 116, arranged in series, forms a resistor string connected at one end to conductor 92 between ground and resistor 93, and at its other end to an interpolator bias potentiometer 118. A conductor 119 extends from point A for servicing the various channels with the same input signal.

From an examination of FIG. 3, it will be seen that the circuit for Channel No. 2 is identical to that for Channel No. 1, except for the equivalent for conductor 84 in channel No. 2 being connected to conductor 119 and the equivalent for conductor 92 in Channel No. 2 being connected to conductor 113 between resistors 114 and 115. Regarding Channel No. 3, its input conductor corresponding to conductor 84 is also connected to conductor 119 and its conductor corresponding to conductor 92 is connected to conductor 113 between resistors 115 and 116. Thus, each of the channels receives the same input signal from point A, and the biases of these channels are distributed by reason of different connections to the resistor string made up of the conductor 113 and resistors such as 114–116. In the embodiment shown in FIG. 3, the bias resistors 114–116 are equal to one another in value so that the various channels have linearly distributed biases.

The interpolator output electrical signals are transmitted via the output conductors 110 of the various channels, which conductors externally of the interpolator 46 are identified by the numeral 51 including that for the first channel, identified as 51F, and that for the last channel, identified as 51L. The number of channels provided corresponds to the number of impedance strings, identified in FIG. 3 as M1, M2, and so on, provided in matrix board 47. Each such impedance string, also representatively designated by the numeral 120, comprises a plurality of impedances, specifically resistors 121, connected in series by intermediate conductors severally having a conductive socket 122. The various conductors 51 are shown as connected to the corresponding ends of the impedance strings 120, these being the right ends in FIG. 3. Adjacent each impedance string 120 is a conductive shorting bar, typically represented by the numeral 123. A selectively settable conductive peg or pin 124 can be inserted in any socket 122 whereby a selected portion of the total available impedance in a given string 120 is put in series between the corresponding input conductor 51 and corresponding shorting bar 123.

In the art of blow molding, the use of a matrix board to program the wall thickness of a parison throughout its length is well known. These boards in the nature of peg boards may have 20 horizontal rows and 20 vertical rows, 30 × 30, 50 × 50, or any desired number in either axis. Typically, the number of impedance strings 120 may represent the number of units into which the length of the parison may be divided, and the number of resistors 121 or sockets 122 in each string may represent the number of increments into which the wall thickness of the parison may be divided. If, for example, a 20 × 20 matrix board is used there would be 20 channels in interpolator 46 which would be severally associated with the 20 impedance strings in matrix board 47.

The output end of each shorting bar 123, being the left end as shown in FIG. 3, is shown as connected by one of the conductors 52 having an input resistor 125 therein to an input 126 of a summing amplifier 128, designated 53 in FIG. 1 The conductor 52 for the first string M1 is also designated 52F, and the last conductor for the last of the strings 120 is designated 52L. A conductor 129 having a bias resistor 130 therein connects the other input 131 of amplifier 128 to ground. Amplifier 128 has an output conductor 132 to which one end of a feedback conductor 133 is connected, the other end being connected to amplifier input 126. A feedback resistor 134 is shown arranged in conductor 133. The function of amplifier 128 is to sum all of the programmed output electrical signals received through conductors 52 from matrix board 47.

Referring to FIG. 3, conductor 132 is connected to an input of a servoamplifier 135, designated 54 in FIG. 1, and is shown as having a resistor 136 in such conductor. This servoamplifier is shown as having two output conductors 138, 139, collectively designated 55 in FIG. 1, which lead to the coils 140 of the electrical force motor of electrohydraulic servovalve 36. The position feedback electrical signal from transducer 42 is fed via conductor 141, designated 56 in FIG. 1, to an input for servoamplifier 135. This feedback conductor 141 is shown as having a resistor 142 therein. A loop gain circuit is shown for servoamplifier 135 in FIG. 3 as comprising a conductor 143 at one end connected to conductor 138 and at its other end to an input of this servoamplifier, and including a potentiometer 144. Servoamplifier 143 is also shown as having a bias control comprising a conductor 145 connected at one end to an input of this servoamplifier and connected at its other end to a potentiometer 146, and including a resistor 148. This bias controls the nominal thickness (called the weight) of the parison 23.

At the moment, let it be assumed that accumulator piston 30 is moving to the right as viewed in FIG. 3. This movement actuates potentiometer 32 which generates an electrical signal fed via conductor 50 to develop a continuously variable electrical signal, specifically a constantly rising voltage, at point A in interpolator 46. This voltage is represented by the inclined line A in FIG. 4 which is a plot of voltage versus numbered stations representing the portion of total volume of plastic extruded. This voltage A is applied to the plurality of channels in the electronic interpolator during a given cycle of machine operation. Each of these channels is biased to be responsive only over a limited range of electrical signal A which extends over the full machine cycle.

Figure 4:
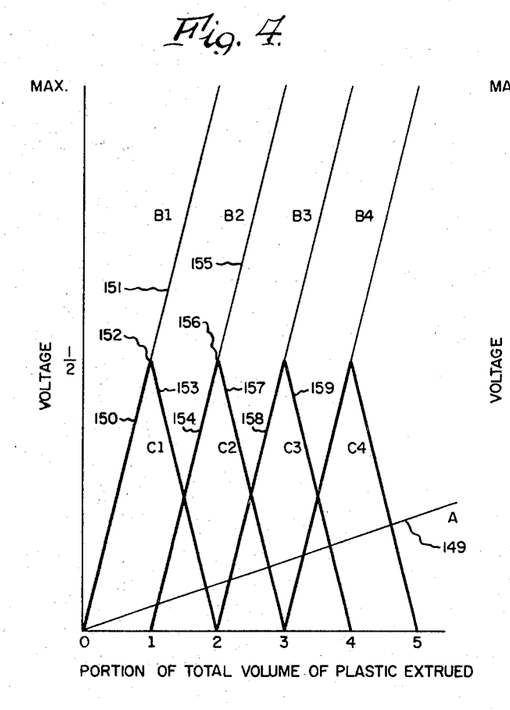
FIG. 4 is a graph depicting partially the output electrical signals of the electronic interpolator circuit means shown in FIG. 3.

Referring to FIG. 4, it will be seen that for a portion of the machine cycle, specifically between stations 0 and 2, the voltage at point B1 in channel No. 1 will develop according to the line designated B1 in FIG. 4, this line extending from zero voltage to the maximum voltage level and includes a lower half portion 150 and an upper half portion 151. This output voltage B1 drives absolute value amplifier 98 that is biased to the midvoltage output level, indicated at point 152 in FIG. 4. This causes the voltage at this midpoint level to reverse direction and follow the downwardly inclined line 153 instead of the upwardly inclined line portion 151, as shown in FIG. 4. The combination of rising and descending lines 150 and 153 between stations 0 and 2 and peaking at level 152 represents a voltage pyramid developed at point C1 in Channel No. 1 and is also designated C1 in FIG. 4.

Considering now Channel No. 2, its bias is such that it is effective between stations 1 and 3 to produce a voltage B2 having a lower half portion 154 and an upper half portion 155 which is reversed at point 156 to follow line 157. The voltage pyramid is produced at point C2 in channel No. 2 and is so designated in FIG. 4.

The bias of Channel No. 3 is such as to render this channel effective only between stations 2 and 4. The voltage B3 is produced at point B3 including a lower half portion 158 has its upper half portion reversed at point C3 to follow line 159, as depicted in FIG. 4.

It is to be noted that voltage line 153 of pyramid C1 exists between stations 1 and 2, and voltage line 154 of pyramid C2 exists between these same stations, and therefore these lines overlap and are summable. Likewise, voltage line 157 of pyramid C2 exists between stations 2 and 3, and voltage line 158 of pyramid C3 exists between these same stations, thus overlapping and being summable.

Figure 5:
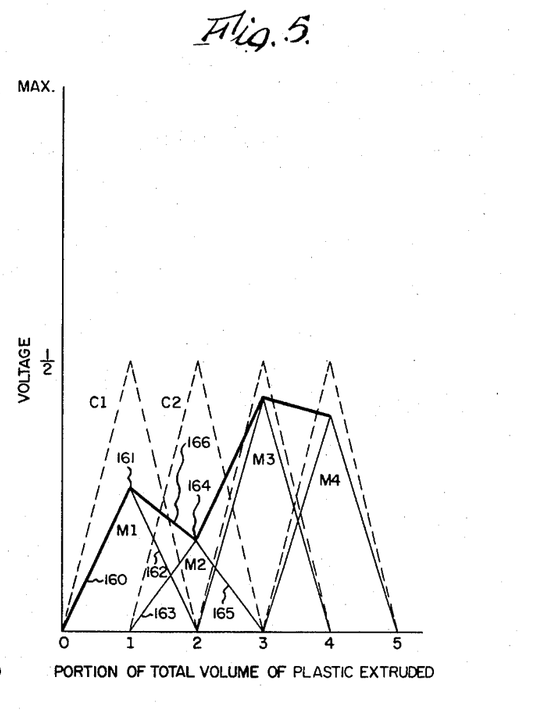
FIG. 5 is a graph depicting the aforementioned interpolator output electrical signals as modified by a program set on the matrix board to provide programmed output signals.

In short summary with reference to FIG. 4, the continuously variable electrical signal A developed during one cycle of operation is converted by the electronic interpolator 46 into a plurality of interpolator output electrical signals C1, C2, C3, etc., responsive to different portions of the total range of signal A. Each of these interpolator output electrical signals, represented by the pyramid voltage curves designated C1, C2, C3, etc., in FIG. 4, is subject to modification by the selectively settable position of a peg 124 in a socket 122 along the corresponding impedance string 120 associated with the corresponding interpolator output electrical signal line 110 (FIG. 3) or 51 (FIG. 1). Thus, if a peg 124 is positioned in a socket 122 halfway along its impedance string 120, such as string M1, the voltage developed at point C1 in Channel NO. 1 of the electronic interpolator will be reduced 50 percent so that the voltage curve or pyramid M1 will rise along line 160 to point 161 and then descend along line 162, as shown in FIG. 5. A peg 124 in impedance string M2 in Channel No. 2 has been set in another sockect 122 therealong so that the percentage of the impedance in such string will cause an interpolator electrical signal developed at C2 to rise along a line 163, reaching a maximum at point 164 and then descend along a line 165, as shown in FIG. 5. Since lines 162 and 163 overalp, they are summed through summing amplifier 128 to produce interpolated line 166 which extends between point 161 and 164. This results in a programmed curve represented by such lines as 160 and 166 which is command input into servoamplifier 135. Such command signal initiates a signal to servovalve 36 and the feedback signal from potentiometer 42 negates this command signal when actuator piston 39 achieves its commanded position resulting in zero error signal in conductors 138 and 139.

In this manner, by the setting or programming of pegs 124 in the various impedance strings 120, the peaks of voltage curves C1, C2, C3, etc., are converted to lower peaks, such as depicted at 161 and 164, depending upon the portion of total impedance available utilized in the various strings to modify the interpolator output signals to provide programmed output signals which are summed to provide a command signal for the servocontroller. The net result is linear interpolation between these lower peaks, as opposed to a step by step change in voltage. This interpolation between programmed voltage peaks produces a smoother control of parison thickness.

As previously stated, the programmed summed signal from summing amplifier 128 is transmitted via conductor 132 as a command signal input to servoamplifier 135 wherein, to the extent cancelled by the feedback signal, it is converted to an error signal transmitted through lines 138, 139 to the coils of electrohydraulic servovalve 36. This error signal operates this servovalve to meter flow to the actuator cylinder 38. Resultant movement of piston 39 in this cylinder shifts pintle 21 with respect to die head 20 and thereby determines the size of variable orifice 22. The size of this orifice will determine at any given instant the wall thickness of the parison being formed. The electrical feedback signal generated by transducer 42 which is responsive to the position of the pintle provides a closed loop control for servovalve 36.

The setting of potentiometer 144 of the servovalve loop determines the gain of such loop and therefor the range of the orifice used.

The setting of potentiometer 146 provides a weight control for the parison.

The setting of potentiometer 75 in electronic interpolator 46 determines the point at which the accumulator starts its rightward movement to cause extrusion of material through orifice 22 so as to form a parison, so-called accumulator zero.

The setting of potentiometer 78 determines the total volume of plastic extruded through orifice 22 during a given cycle of operation of the extrusion apparatus, so-called shot size.

As previously alluded to, conductor 58 senses the commencement of a signal in conductor 51F and will actuate machine cycle controller 49 so as to start a cycle of operation. By definition herein, the cycle of operation commences with rightward movement of accumulator piston 30, while screw 27 is stationary. With this screw stationary, it will be seen that accumulator piston 30 operates against a blocked volume of placticized material which can only escape from chamber 28 by extrusion through variable orifice 22 so as to form parison 23. Rightward movement of accumulator piston 30 is caused by energization of solenoid valve 45 whereby pressurized fluid is introduced via conduit 44 into accumulator chamber 43 to drive the piston 30 in a rightward direction. Solenoid valve 45 is shown in such energized condition in FIG. 1 and is under control from machine cycle controller 49 by an electrical signal transmitted via conductor 60.

Hydraulic motor 33 for plasticizer screw 27 is controlled in operation by solenoid valve 34. This valve in turn is under control of machine cycle controller 49. In FIG. 1, this valve 34 is shown in a de-energized condition in which the connections of hydraulic motor 33 to a source of pressurized fluid P and return R are blocked. When energized, this solenoid valve 34 receives an electrical signal transmitted via conductor 61 from machine cycle controller 49 to cause motor 33 to be connected to supply P and return R and thereby operated.

Rightward movement of accumulator piston 30 continues until the commencement of a signal, generated by the last channel transmitted via conductor 51L, is sensed via branch conductor 59 leading to machine cycle controller 49. This controller will then operate to de-energize solenoid valve 45 whereby accumulator chamber 43 is connected to return, and to energize solenoid valve 34 by transmitting an electrical signal through conductor 61. Operation of solenoid valve 34 will cause hydraulic motor 33 to be driven and thereby rotate screw 27. This will move plastic material from hopper 25 into screw chamber 24 wherein it will be heated into a fluid state and thereafter forced by the screw 27 towards chamber 28. At this time pintle 21 will be closed or seated against die head 20, the signal for so closing orifice 22 being transmitted from machine cycle controller 49 via conductor 62 to the electronic circuitry associated with servovalve 36, represented by electronics box 48. Forcing fluidized plastic material into chamber 28 will cause accumulator piston 30 to retract or move in a leftward direction. When so moving, fluid will be displaced from chamber 43 and flow outwardly through conduit 44 to fluid return R. This recharging of the accumulator continues until accumulator piston 30 has returned to its starting position at which it is stopped by control of machine cycle controller 49.

Figure 2:
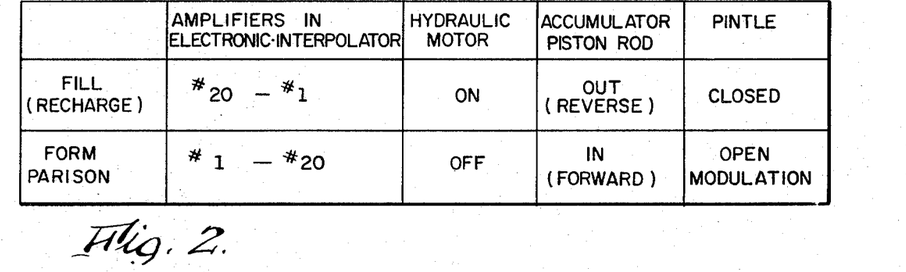
FIG. 2 is a function chart for one cycle of operation of the extrusion apparatus and associated control mechanization illustrated in FIG. 1.

The cycle of operation of the extrusion apparatus shown in FIG. 1 is depicted functionally in the tabulation or chart in FIG. 2. Referring to this Figure, it will be seen that during the time the position transducer 32 is moving corresponding to the reverse sequence of Channels No. 20 through Channel No. 1, hydraulic motor 33 will be on, accumlator piston rod 31 will be moving out or reversing, and pintle 21 will be in a closed position. However, during the portion of a machine cycle devoted to formation of a parison 23, the amplifiers in electronic interpolator 46 will sequence through Channels No. 1–20, while hydraulic motor 33 remains off and accumulator piston rod 31 is moving in or forwardly, and pintle 21 is unseated and being modulated by the servocontroller means 35.

Figure 6:
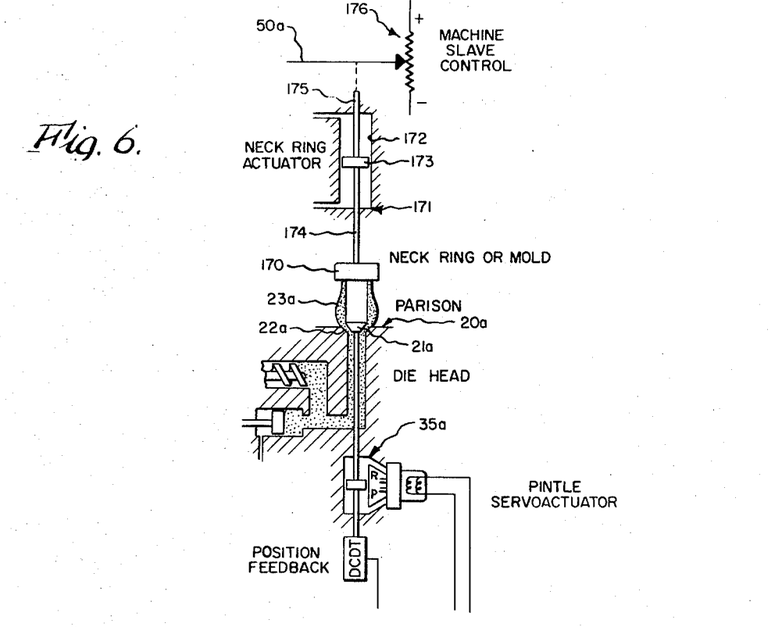
FIG. 6 is a fragmentary schematic view similar to the upper right hand portion of FIG. 1, and illustrating another embodiment of the invention characterized by being machine slaved to the movement of a parison neck ring.

FIG. 6

In the form of the invention illustrated in FIGS. 1 through 5, operation of the electronic interpolator 46 was shown machine-slaved to movement of accumulator piston 30. In the modified form of the invention depicted in FIG. 6, electronic interpolator is also machine-slaved but to a different movable element of the extrusion apparatus. In particular, the generation of the continuously variable electrical signal serving as an input to the electronic interpolator 46 is depicted in FIG. 6 as machine-slaved to movement of a parison neck ring or mold 170. This neck ring is moved by a fluid-operated actuator 171 including a cylinder 172 in which a piston 173 is slidably arranged. A piston rod 174 connects one side of this piston 173 to neck ring 170. On the opposite side of the piston, a piston rod 175 extends through the end wall of cylinder 172 and is operatively associated with a position transducer represented generally by the numeral 176. Specifically, this transducer is shown in the form of a potentiometer. The signal generated by this transducer 176 is transmitted via line 50a which corresponds to line 50 in FIGS. 1 and 3.

To complete the description of FIG. 6, neck ring 170 supports the upper end of a parison 23a which is shown as being formed by extruding material upwardly from a die head 20a, rather than downwardly as shown in FIGS. 1 and 3. A pintle 21a cooperates with die head 20a to form a variable orifice 22a through which the plastic material is extruded. Positional control of the pintle 21a relative to die head 20a is determined by a servocontroller means 35a which is similar to the servocontroller means 35 shown in FIGS. 1 and 3.

For a more complete description, if desired, of extrusion apparatus for forming a parison employing a neck ring or mold, reference is made to the disclosure of U.S. Pat. No. 3,012,286.

Accordingly, it will be seen that the continuously variable electrical signal serving as an input for the electronic interpolator 46 can be generated by a transducer of any suitable type associated operatively with any suitable movable element of the extrusion apparatus. In the case of the machine slave control being related to accumulator piston 30 movement, as depicted in FIGS. 1 and 3, the input signal to the electronic interpolator transmitted via conductor 50 represents the total volume of plastic extruded which breaks down into portions as depicted by the numbered stations in FIGS. 4 and 5. On the other hand, in the case of machine slave control being operatively associated with the movement of the parison neck ring 170, as depicted in FIG. 6, the generation of a continuously variable interpolator input signal, which is actually a constantly rising voltage, is directly related to parison length.

Figure 7:
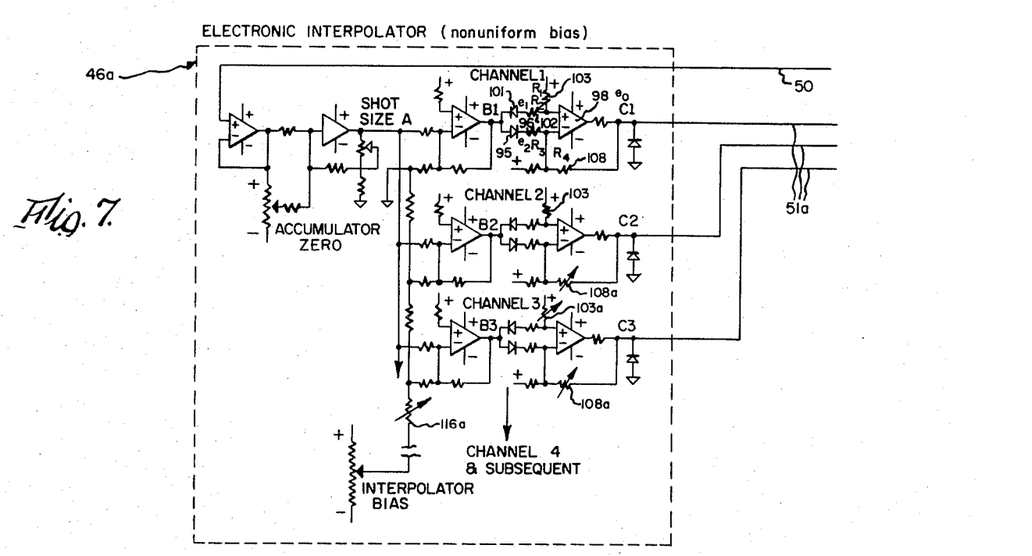
FIG. 7 is a circuit diagram of a modified form of electronic interpolator characterized by having nonlinearly distributed biases.
Figure 8:
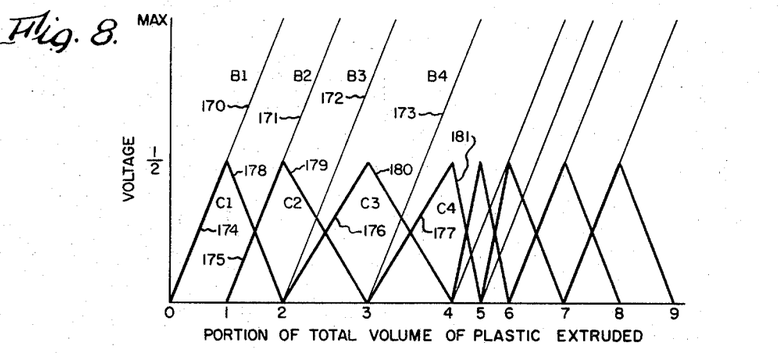
FIG. 8 is a graph depicting partially the output electrical signals of the modified electronic interpolator circuit means shown in FIG. 7.
Figure 9:
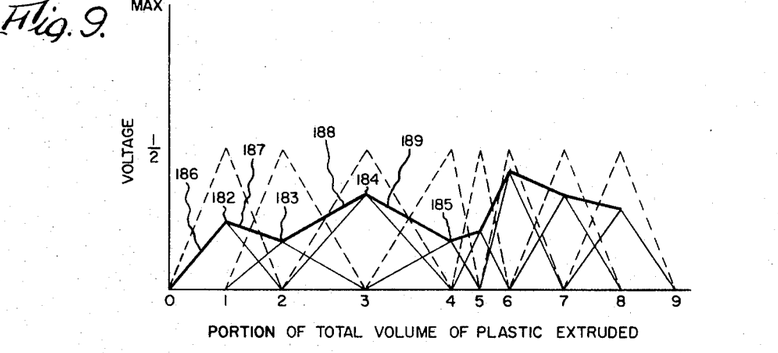
FIG. 9 is a graph depicting the interpolator output electrical signals of FIG. 8 as modified by a program set on the matrix board to provide programmed output signals.

FIGS. 7 – 9

In the electronic interpolator 46 depicted in FIG. 3, the bias of the various channels was uniformly distributed by reason of the biased resistors 114–116 being of equal value. This produced a uniform spacing of the voltage curves B1, B2, B3 and so on, depicted in FIG. 4. It is not essential that such spacing be uniform. In fact, at times it may be preferable to space such voltages closer together or farther apart. For example, adjacent the neck of a bottle to be blown from a parison, it may be desirable to have a finer control of parison thickness, as would be obtainable through a closer spacing of the B voltage curves as depicted in FIG. 4, or farther apart as where the change in parison thickness is either not so critical or does not change for large portions either of the total volume of the parison or for substantial portions of the length of the parison.

Such an arrangement is shown possible by the electronic interpolator 46a having a non-uniform bias for its various channels, depicted in FIG. 7. Comparing the interpolators shown in FIGS. 3 and 7, it will be seen that in FIG. 7 resistor 108 in Channel No. 1 is shown as a variable resistor 108a in each of Channels No. 2 and No. 3; that resistor 103 shown in Channels No. 1 and No. 2 is shown in Channel No. 3 as a variable resistor 103a; and that resistor 116 (FIG. 3) for Channel No. 4 (not shown) is shown in FIG. 7 as a variable resistor 116a. Referring to Channel No. 1 in electronic interpolator 46a, resistor 103 is designated $R_1$; resistor 102 is designated $R_2$; resistor 96 is designated $R_3$; and resistor 108 is designated $R_4$. Still referring to FIG. 7, the voltage input for resistor $R_2$ after diode 101 is designated $e_1$ and the voltage input for resistor $R_3$ after diode 95 is designated $e_2$; and the voltage connection point C1 is designated $e_0$ and represents output voltage. This output signal voltage $e_0$ is related to the input signal voltages $e_1$ and $e_2$ in the form expressed by the equation:

$$e_0 = e_1 (R_1/R_2) - e_2 (R_4/R_3)$$

With Channel No. 1 as shown in FIG. 7, the voltage generated at point B1 will follow the line 170 depicted in FIG. 8; that generated at point B2 in Channel No. 2 will follow the line 171 depicted in FIG. 8; that developed at point B3 in Channel No. 3 will follow the line 172 depicted in FIG. 8; that depicted at the corresponding point B4 in Channel No. 4 (not shown) will be as represented by the line 173 in FIG. 8. At the corresponding output voltage points C1, C2, C3 and C4 for Channels No. 1–4, respectively, the voltages will for their initial rising parts follow the lines 174–177, respectively, and for the descending parts will follow the lines depicted at 178–181, respectively.

Now if it is assumed that a matrix board similar to the board 47 shown in FIG. 3 is suitably programmed and receives via conductors 51a the various output signals of the nonuniformly biased electronic interpolator 46a shown in FIG. 7, different peaks such as depicted at 182–185 in FIG. 9 can be developed which will cause interpolated and summed voltages represented by lines 186–189.

It will be seen that the spacing between stations 2 and 3, and between stations 3 and 4, is greater than that between stations 0 and 1, and between stations 1 and 2. Also, the spacing between stations 4 and 5, and between stations 5 and 6, is closer than the spacing between any of the preceding stations.

Thus by adjusting the various resistors $R_1$ to $R_4$ according to the equation stated hereinabove, nonlinearly distributed biasing effects can be produced for the various channels which will enable the spacing between the beginning points of the various voltage curves B1 to B4 shown in FIG. 8 to be varied.

Referring specifically to FIGS. 7 and 8, the gains for the input component circuits for absolute value amplifier 98 in Channel No. 1, and corresponding to lines 174 and 178 in FIG. 8, remain unchanged. For Channel No, 2, the gain for the input component circuit corresponding to line 175 in FIG. 8 is unchanged but the gain for the input component circuit corresponding to line 179 in FIG. 8 has been reduced, giving a flatter slope to the line 179 than for the line 175. Considering Channel No. 3, the gain in both input component circuits has been changed with the gain for the input component circuit corresponding to the rising line 176 being reduced and that in the other input component circuit also being reduced a corresponding amount to give the correspondingly downwardly sloped line 180 in FIG. 8. Assuming a gain in both input component circuits for Channel No. 4 were changed, with that in the circuit corresponding to rising line 177 in FIG. 8 being reduced and that corresponding to descending line 181 in FIG. 8 being increased, and with the bias change in resistor 116a, the spacing between line B4 and its predecessor B3 in FIG. 8 is greater than the uniform spacing between lines B1 to B3 depicted in FIG. 8.

From the foregoing, it will be seen that not only the spacing between lines at connection point B in the various channels, which produce the sloped lines B1 to B4 etc. in FIG. 8, can be changed by varying the bias resistor such as resistor 116a, but the slopes of the signal outputs at connection points C1 to C4, etc. in the various channels can be changed by varying the values of the various resistors $R_1$ to $R_4$ according to the aforementioned equation.

Figure 10:
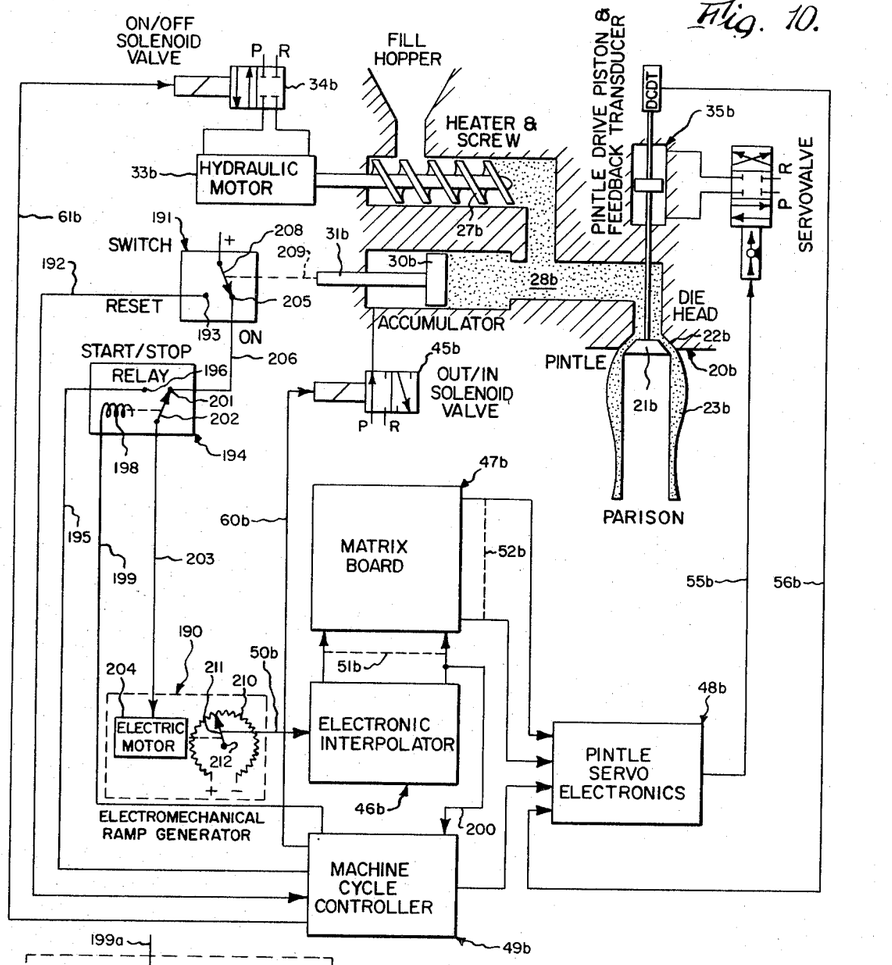
FIG. 10 is a combined schematic view and block diagram, similar to FIG. 1, but showing another embodiment of the present invention, characterized by an electromechanical type ramp generator to provide a continuously variable electrical signal as the input signal to the electronic interpolator.

FIG. 10

FIG. 10 depicts a schematic extrusion apparatus having a cycle of operation related to a voltage ramp generator 190 including an electromechanical integrator. This necessitates some changes in the control of the different parts of the extrusion apparatus as compared with that disclosed in FIG. 1. These differences will now be described.

Referring to FIG. 10, a parison 23b is formed by a variable orifice 22b determined by relative movement between a pintle 21b and a die head 20b. Movement of this pintle is controlled by servocontroller means 35b operatively associated with a pintle servo electronics box 48b via conductors 55b and 56b. A matrix board 47b is shown as being operatively associated with electronics box 48b via a plurality of conductors represented collectively by the broken line 52b. This matrix board 47b is also shown operatively associated with an electronic interpolator 46b which receives an input signal via conductor 50b from a ramp generator 190, and transmits interpolator output electrical signals via a plurality of output conductors leading to matrix board and represented collectively by the broken line 51b. A machine cycle controller 49b is also shown as operatively associated with electronics box 48b via conductor 62b. This controller is also shown as operatively associated with solenoid valve 45b via conductor 60 b, and with solenoid valve 34b via electrical conductor 61b. This controller 49b is further shown as being operatively associated with a switch 191 via an electrical conductor 192 connected to a reset terminal 193 of this switch. The controller 49b is also shown as operatively associated with a start/stop relay 194 via a conductor 195 which leads to a relay terminal 196. This relay 194 is also shown as including a coil 198 connected operatively via a conductor 199 with machine cycle controller 49b. The electronic interpolator output line for the last channel thereof is shown as connected operatively via conductor 200 with machine cycle controller 49b.

Relay 194 is shown as having another terminal 201 and an armature 202 connected via conductor 203 with an electric motor 204 comprising an element of the ramp generator 190. Armature 202 can be moved from contact with terminal 201 to terminal 196 by energization of coil 198.

Terminal 201 of relay 194 is shown as connected to a second terminal 205 of switch 191 via a conductor 206. This switch is shown as having a movable element 208 connected to a suitable electrical source and can be moved by accumulator piston rod 31b as represented by the connection depicted by broken line 209.

Adverting to the ramp generator 190, the same is also shown as including a rotary type potentiometer 210 connected at opposite ends to a suitable electrical source and also having a movable element in the nature of a wiper designated 211 mounted for rotary motion on a shaft 212 driven by electric motor 204. The electrical signal developed by potentiometer 210 depends upon the position of wiper element 211 with respect to the resistor element of this potentiometer and such signal is transmitted to the electronic interpolator 46b via conductor 50b which is shown as connected to element 211. In the schematic view illustrated in FIG. 10, movable contact 208 of switch 191 is shown engaging terminal 205, which is in turn connected via conductor 206 to terminal 201, in turn connected via armature 202 to conductor 203 and hence to electric motor 204 so as to energize the latter, thereby causing wiper element 211 to rotate from one end to the other end of the annular resistor of the potentiometer 210. Such rotary movment of wiper element 211 generates during each machine cycle a continuously increasing and hence variable electrical signal represented by the line 213 in FIG. 12.

When a signal is received in line 200 from the last channel of electronic interpolator 46b, machine cycle controller 49b becomes operative to energize coil 198 of relay 194 to move armature 202 off terminal 201 onto terminal 196 and thereby stop running of electric motor 204. At the same time, controller 49b will energize solenoid valves 34b and 45b so as to cause hydralic motor 33b to rotate screw 27b and by recharging chamber 28b drive accumulator piston 30b leftward. This leftward movement will continue until piston rod 31b moves contact 208 of switch 191 off terminal 205 and into engagement with terminal 193 so as to reset the apparatus for another cycle of operation.

It is to be understood that in the apparatus depicted in FIG. 10, the electronic interpolator 46b may be of the type designated 46 (FIG. 3) or 46a (FIG. 7). The essential difference is that the continuously variable input electrical signal for the interpolator is derived from the ramp generator 190 in FIG. 10, whereas it is derived from a transducer 32 or 176 driven by a movable element of the machine such as the accumulator piston 30 in FIG. 3 or the parison neck ring or mold 170 in FIG. 6.

Likewise, matrix board 47b may be of the single program type shown in FIG. 3, or the multiple program type shown in FIGS. 13 and 14, later to be described herein.

In general, elements shown in FIG. 10 that are similar to the corresponding ones shown in the preceding Figures are designated by the same reference numerals, except for the addition of a letter suffix.

Otherwise, the operation of the apparatus disclosed in FIG. 10 is similar to that described in connection with the preceding Figures.

Figure 11:
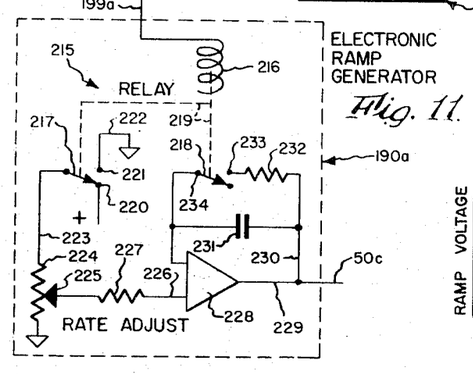
FIG. 11 is a fragmentary view illustrating the circuit of an electronic type ramp generator that may be used with the extrusion apparatus shown in FIG. 10.
Figure 12:
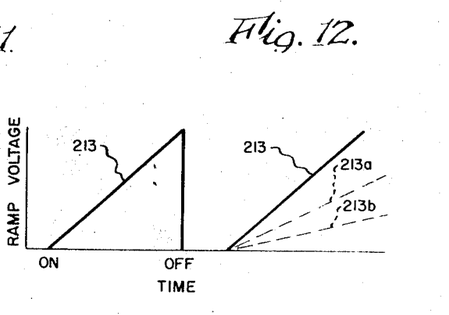
FIG. 12 is a wave diagram indicating the ramp type output signal from the generators shown in FIGS. 10 and 11.

FIGS. 11 – 12

The voltage ramp generator shown in FIG. 10 includes an electromechanical integrator provided by the combination of the electric motor 204 and potentiometer 210. Instead of such an electromechanical type of ramp generator, a ramp generator having an electronic integrator may be employed. Such is disclosed in FIG. 11 and is represented generally by the numeral 190a. This electronic ramp generator 190a is shown as including a relay 215 having a coil 216 connected to an electrical conductor 199a, which corresponds to conductor 199 in FIG. 10. This relay 215 is of the double pole type including a first armature 217 and a second armature 218, both movable by energization of coil 216, which movement and the joint connection between armatures is represented by the broken lines 219. Armature 217 is shown as being in contact with a first terminal 220 connected to a suitable electrical source, and is also operatively associated with a second contact 221 which is connected via conductor 222 to ground. Armature 217 is shown connected to ground via a conductor 223 having a resistor 224 therein. This resistor 224 is shown as having a movable contact 225 in association therewith which is at one end of a conductor 226 having a resistor 227 therein, leading to an input of an operational amplifier 228. This amplifier has an output conductor 229. A feedback conductor 230 at one end is connected to conductor 229 and at its other end to another input of amplifier 228. In this feedback conductor 230 is a capacitor 231 which in combination with the amplifier 228 provides an integrator. Capacitor 231 is shown bypassed by a conductor having in series therein a resistor 232 and two open terminals 233 and 234. Armature 218 of relay 215 is shown as being electrically connected to terminal 234 but is not shown connected to the other terminal 233, although adapted to engage the same upon energization of relay coil 216.

Electronic ramp generator 190a is shown in FIG. 11 as turned on or operating and thus a current flows through conductors 223 and 226 into amplifier 228 which in combination with the capacitor feedback produces a constantly rising and continuously variable signal output transmitted via conductor 50c. This signal is also represented by the line 213 in FIG. 12. Conductor 50c corresponds to the conductor 50b in FIG. 10 and transmits the continuously variable electrical signal as an input to electronic interpolator 46b.

At the end of a cycle of operation, relay 216 is energized so as to reset the electronic ramp generator 190a for another cycle of machine operation. Specifically, energization of relay 215 moves armatures 217 and 218 into contact with their respective terminals 221 and 233. Engagement of armature 217 with terminal 221 turns off amplifier 228, and contact of armature 218 with terminal 233 bleeds off the charge on capacitor 231. The potentiometer provided by resistor 224 and movable contact 225 adjusts the rate of ramp voltage generation in relation to time, and hence the slope of a voltage line such as represented at 213. At the right hand portion of FIG. 12, different possible slopes of ramp voltage line 213 are represented by broken lines 213a and 213b.

Figure 13:
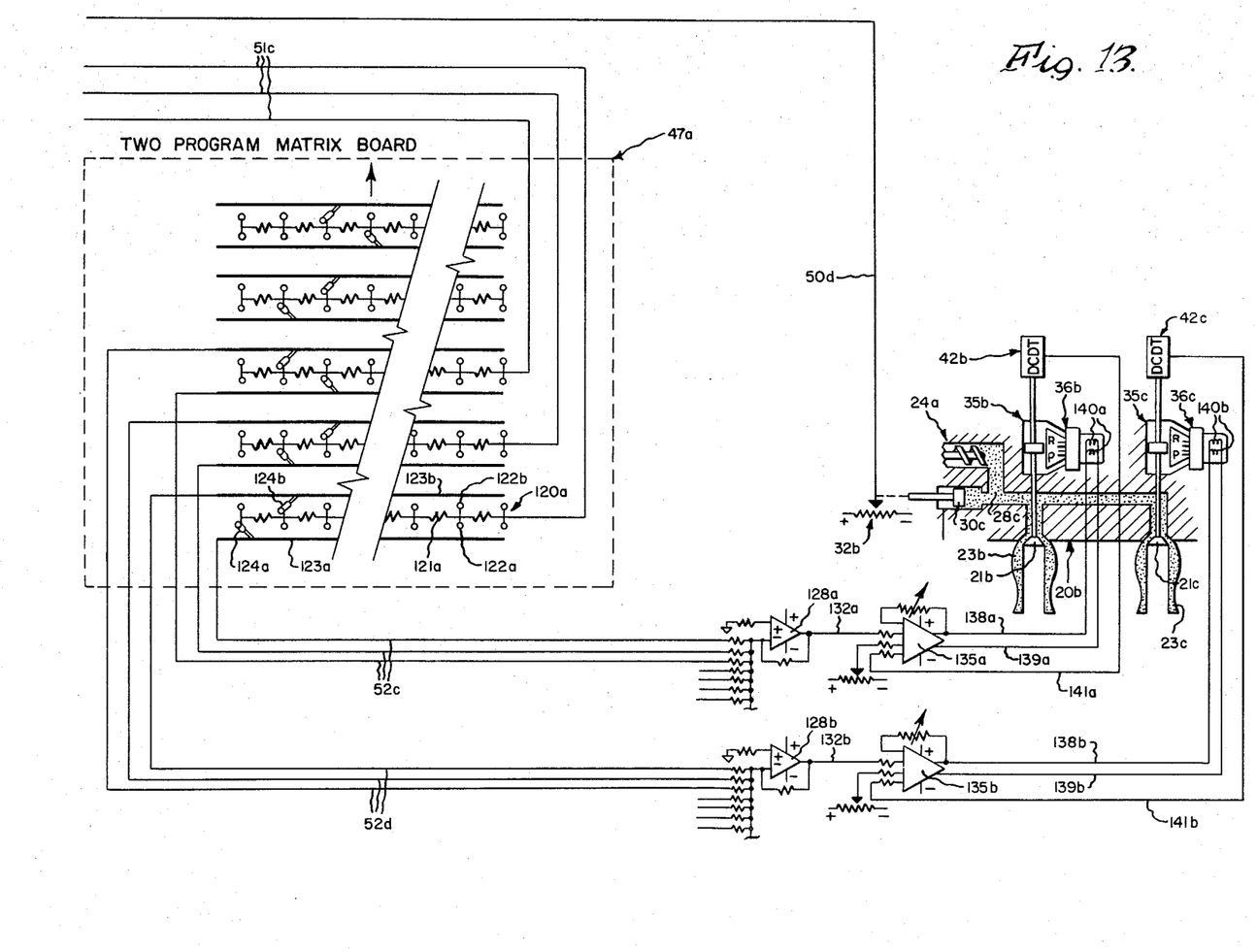
FIG. 13 is a circuit diagram of a modified form of matrix board, serviced by a single interpolator such as shown in FIG. 3, the matrix board being characterized by having two sets of shorting bars for two programs which can be used simultaneously to produce separate command signals for separate servocontroller means, shown specifically for controlling separate pintles in a multihead plasticizer to form separate parisons.

FIG. 13

A single electronic interpolator such as 46 shown in FIG. 3 can service a matrix board which has two shorting bars associated with each impedance string whereby two programs can be set up and used simultaneously to provide separate command signals for separate sevocontroller means. Such an arrangement is depicted schematically in FIG. 13.

Referring to FIG. 13, the two program matrix board is represented generally by the numeral 47a and is shown as including a plurality of impedance strings individually represented by the numeral 120a. The impedance string 120a differs from the string 120 in that instead of providing only a single conductive socket as in the string 120, in the string 120a a pair of conductive sockets designated 122a and 122b are provided at each tap between adjacent impedances 121a. A first shorting bar 123a is shown arranged adjacent its corresponding impedance string 120a on one side thereof. A second and similar shorting bar 123b is arranged on the opposite side of the impedance string. Two sockets 122a and 122b are provided in parallel at each tap. The various sockets 122a are adapted to receive selectively settable conductive pegs 124a, while similar pegs 124b are adapted to be selectively inserted in any of the sockets 122b.

The various impedance strings 120a severally receive electronic interpolator output electrical signals through conductors 51c which are similar to the conductors 51 in FIG. 3. The shorting bars 123a of the various impedance strings 120a are fed to a first summing amplifier 128a via conductors 52c which are similar to the conductors 52. The other shorting bars 123b of the various impedance strings are fed to a second summing amplifier 128b via conductors 52d which are also similar to conductors 52. Also, summing amplifiers 128a and 128b severally are similar to the summing amplifier 128.

Operatively associated with summing amplifier 128a is a servoamplifier 135a connected via input conductor 132a. Servoamplifier 135a has signal output conductors 138a and 139a which service coils 140a of the electrical force motor of an electrohydraulic servovalve 36b. This servovalve controls the movement of a first pintle 21b relative to a die head 20b to form a first parison 23b. The pintle and servovalve are part of a multi-head plasticizer 24a including an accumulator piston 30c operatively associated with a position transducer 32b which generates a continuously variable electrical signal responsive to piston movement and transmitted via conductor 50d to an electronic interpolator such as the one shown at 46 in FIG. 3. Movement of the actuator for the pintle 21b is detected by a position feedback transducer 42b to generate a feedback electrical signal transmitted via conductor 141a to servoamplifier 135a.

Chamber 28c of plasticizer 24a is manifolded to provide a second pintle and die head combination. This second pintle is indicated at 21c and is movable relative to die head 20b so as to provide a variable orifice to produce a second parison 23c. This pintle 21c is moved by servocontroller means 35c including an electrohydraulic servovalve 36c. The coils 140b of this servovalve are supplied with an electrical command signal via output conductors 138b and 139b from a servoamplifier 135b which receives summed programmed output signals from summing amplifier 128b via conductor 132b. A position feedback signal is generated by transducer 42c responsive to movement of the actuator piston for pintle 21c and is fed back to servoamplifier 135b via a feedback conductor 141b.

According to the form of the invention illustrated and described in FIG. 13, two separate programs can be set up on matrix board 47a. One program is determined by the setting of pegs 124a which are associated with one set of shorting bars 123a. The programmed output signals from these shorting bars 123a are fed via conductor 52c to summing amplifier 128a and thence to servoamplifier 135a which generates an error signal to control the operation of servoactuator means 35b for pintle 21b. The other program is determined by the setting of pegs 124b with respect to shorting bars 123b. The various programmed output signals from these shorting bars are transmitted via conductors 52d to summing amplifier 128b and thence to servo-amplifier 135b which generates an error signal for control for servoactuator means 135c for the other pintle 21c.

It will be appreciated that with matrix board 47a the program for formation of one parison may be completely independent and different from that for the formation of the other parison, even though the same electronic interpolator provides input signals to the various impedance strings 120a. Accordingly, the parisons 23b and 23c can be of different wall thicknesses, compared one to the other.

Figure 14:
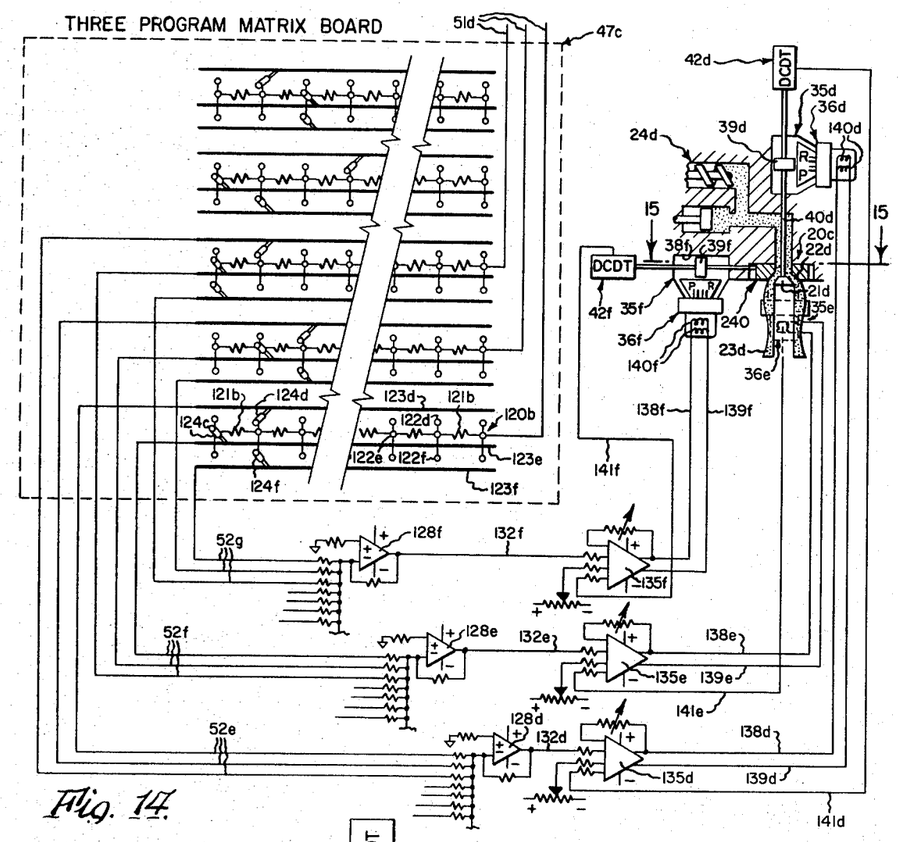
FIG. 14 is a circuit diagram of another modified form of matrix board, serviced also by a single interpolator such as shown in FIG. 3, the matrix board being characterized by having three sets of shorting bars for three programs, which can be used to produce simultaneously separate command signals for separate servocontroller means, shown specifically for controlling relative pintle and die movement in one direction, and relative die and die head movement in two transverse directions, so as to product an asymmetrically variable orifice.
Figure 15:
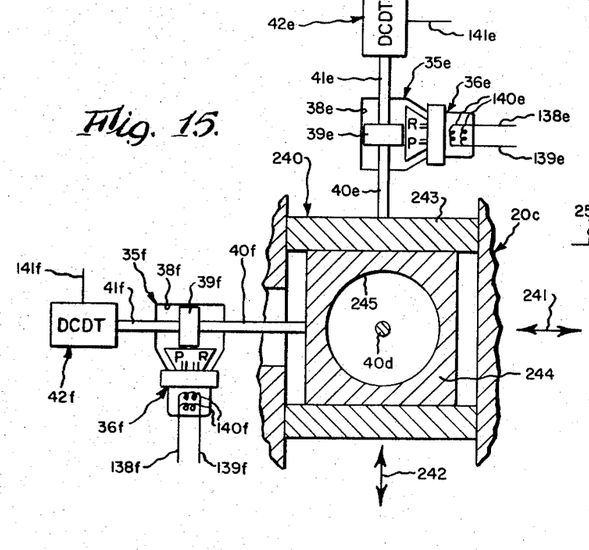
FIG. 15 is an enlarged fragmentary horizontal view through the die head shown in FIG. 14, this view being taken generally on line 15—15 thereof, and showing the two servocontroller means for effecting movement of the die in perpendicular directions transverse of longitudinal movement of the pintle.

FIG. 14 – 15

In FIG. 14, a three program matrix board 47c is shown for providing three sets of programmed signals to operate three servocontroller means. The three functions controlled by such plural servocontroller means include the formation of a single parison 23d by relative movement of a pintle 21d longitudinally of its actuator piston rod 40d, and also by moving transversely of the pintle a movable die, represented generally by the numeral 240, in two perpendicular transverse directions represented by the arrows 241 and 242 in FIG. 15. The plasticizer 24d shown in FIG. 14 is formed to accomodate such transverse movement of the die 240 relative to die head 20c.

Referring to FIG. 15, die 240 includes a saddle member 243 slidably arranged on die head 20c for movement in the direction of arrow 242 and having a suitable opening extending vertically therethrough. Slidably arranged on saddle member 243 for movement in the direction of arrow 241 is a die slide member 244 having a circular opening 245 extending vertically therethrough which cooperates with the periphery of the circular head of pintle 21c to provide a variable orifice 22d through which plastic material is forced to form parison 23d. In FIG. 15, opening 245 is shown concentric with the stem or piston rod 40d for pintle 21d. However, it will be appreciated that by the combined shifting of members 243 and 244 in the directions 241 and 242, the die opening can be arranged eccentrically with respect to pintle rod 40d so that parison 23d may have an asymmetrical cross section.

Longitudinal vertical movement of pintle 21d is shown as being controlled by servoactuator means 35d including an electrohydraulic servovalve 36d having electrical force motor coils 140d. The position of the actuator piston 39d for pintle 21d is sensed by a position transducer 42d.

Movement of saddle member 243 is shown as controlled by servocontroller means 35e including an electrohydraulic servovalve 36e having electrical force motor coils 140e. Such means 35e also include a piston 39e connected on one side to saddle member 243 by a rod 40e. On the opposite side of this piston a rod 41e extends outwardly through cylinder 38e and is operatively associated with a position transducer 42e.

Servocontroller means 35f are shown as being operatively associated with die slide member 244. More specifically, such means include a cylinder 38f in which a piston 39f is slidably arranged to provide end chambers serviced by an electrohydraulic servovalve 36f having electrical force motor coils 140f. Piston 39f is connected to member 244 by a piston rod 40f. A second piston rod 41f on the opposite side of piston 39f is operatively associated with a position transducer 42f.

An error signal is fed to coils 140d via conductors 138d and 139d leading from a servoamplifier 135d which receives via conductor 132d a command signal from summing amplifier 128d. The feedback signal generated by transducer 42d is transmitted via conductor 141d to this servoamplifier 135d in which it is algebraically summed with the command signal to produce the error signal.

In similar fashion, coils 140e are serviced with an error signal transmitted via conductors 138e and 139e leading from another servoamplifier 135e which receives a command signal from summing amplifier 128e via conductor 132e. The feedback signal from transducer 42e is transmitted back to servoamplifier 135e via a feedback conductor 141e.

Likewise, coils 140f are supplied with an error signal transmitted via conductors 138f and 139f leading from still another servoamplifier 135f which receives its command signal through conductor 132f from summing amplifier 128f. The feedback signal generated by transducer 42f is transmitted back to servoamplifier 135f via a conductor 141f. The various servoamplifiers 135d, 135e and 135f, are similar to the previously described servoamplifiers 135, 135a and 135b.

Referring to the three program matrix board 47c illustrated in FIG. 14, the same is shown as comprising a plurality of impedance strings individually represented by the numeral 120b. Each such string comprises a plurality of impedances 121b separated by taps which include in parallel three conductive sockets 122d, 122e and 122f. Adjacent the row of sockets 122d is a first shorting bar 123d. A second shorting bar 123e is disposed adjacent the row of sockets 122e. A third shorting bar 123f is arranged adjacent the third row of sockets 122f. Each of these rows of sockets is adapted to receive a conductive peg, represented typically at 124d, 124e and 124f, respectively. These pegs are adapted to contact the corresponding shorting bars so as to place in circuit different portions of a given impedance string desired for each of the three programs.

The various shorting bars 123d are shown as connected to summing amplifier 128d by individual conductors 52e. Similarly, the various shorting bars 123e are shown connected to summing amplifier 128e via individual conductors 52f. Likewise, the various shorting bars 123f are shown connected to summing amplifier 128f via a plurality of individual conductors 52g. The several summed output signals from the summing amplifiers 128d, 128e and 128f are transmitted to their respective servoamplifiers 135d, 135e and 135f, via conductors 132d, 132e and 132f as previously described. The various summing amplifiers 128d, 128e and 128f, are similar to the previously mentioned summing amplifiers 128, 128a and 128b. Also, the servoamplifiers 135d, 135e and 135f are similar to the previously mentioned servoamplifiers 135, 135a and 135b.

The various impedance strings 120b are serviced individually by conductors designated 51d which transmit from an electronic interpolator, such as the one designated 46 in FIG. 3, interpolator output electrical signals responsive to different portions of the total range of a continuously variable electrical signal, regardless of how generated. Conductors 51d correspond to the previously mentioned conductors 51.

From the foregoing, it will be seen that three programs can be set up on matrix board 47c by the selected positioning of pegs 124d, 124e and 124f in their respective rows of sockets 122d, 122e and 122f.

While in FIG. 14 three preset programs are utilized to control three separate functions to form a single parison 23d, it will be understood that any desired three functions can be controlled by three servocontroller means, such as the means 35d, 35e and 35f. For example, three separate parisons might be controlled, or two parisons with a movable die for one parison so as to provide an asymmetrical parison and a separate symmetrical parison. The generation of an asymmetrical parison is for the purpose of providing an excess or reduced amount of plastic material in the desired angular location which might be utilized to provide a handle on a bottle, for example. In other words, the utilization of the three command signals in FIG. 14 is illustrative only of one set of three functions which might be controlled.

Figure 16:
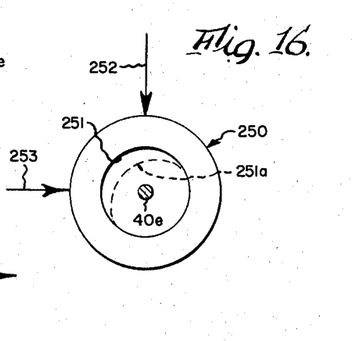
FIG. 16 is a schematic illustration of a deformable annular die, which has an opening therethrough that can be deformed to the illustrative broken line contour by the application of forces applied by servoactuators in the directions of the two arrows shown.

FIG. 16

Instead of providing a multi-part die such as the die 240, a deformable die made of rubber, for example, may be employed and adapted to be deformed in two perpendicular transverse directions. Such a deformable die is represented schematically in FIG. 16 and is designated 250. This die is of annular form and made of a suitable deformable material such as rubber and has an internal opening 251. A force is adapted to be applied in a first transverse direction, represented by the arrow 252, and a separate force is adapted to be applied in a second transverse direction, represented by the arrow 253. These forces can be generated by servoactuator means comparable to those indicated at 35e and 35f in FIG. 15. The effect of forces applied in the directions or arrows 252 and 253 is to distort the annular die member 250 so that its opening assumes an oval or other out-of-round configuration, such as represented by the broken line 251a, rather than a circular configuration as represented by the solid line. It will be seen that this oval shaped opening 251a is asymmetrical with respect to the stem 40e of a pintle so that the variable orifice provided between the pintle head and the die opening 251a will provide an annular variable orifice of asymmetrical configuration.

While the position feedback transducers 42, and 42b to 42f in the various servo loops are shown as being direct current differential transformers, as is preferred, they may be of any other suitable dc type such as potentiometers. They may also be of the linearly variable differential transformer type, if alternating current is used.

In the various matrix boards described such as 47, 47a and 47c, the impedance strings preferably comprise strings of resistors since a direct current is employed. However, if an alternating current is fed to the strings the impedance elements may be inductance or capacitance elements.

From the foregoing, it will be seen that the present invention contemplates a combination of different means to convert a continuously variable electrical signal into one or more programmed command electrical signals to control the operation of a corresponding number of servocontroller means. From the embodiments disclosed herein, it will be seen that the means for generating the continuously variable signal can be the result of slaving to some movable element of the extrusion apparatus, such as the accumulator piston or parison neck ring. Instead of this, the continuously variable signal can be generated by a ramp generator having either an electromechanical integrator or an electronic integrator, as has also been disclosed. The inventive combination includes the highly important element of electronic interpolator means which provides a plurality of interpolator output electrical signals responsive to different portions of the total range of the continuously variable signal used as an input to the interpolator means. As was seen by the embodiments disclosed, the electronic interpolator means comprises a plurality of electronic amplifier means having distributed biases to provide the interpolator output signals. These biases can be either linearly distributed or non-linearly distributed, as disclosed. While the servocontroller means preferably includes electro-hydraulic servovalve and actuator combinations, this is not essential and any other suitable type of servocontroller means is within the contemplation of the present invention. Finally, it will be seen that the present invention contemplates programmable means for selecting portions of the interpolator output signals to provide programmed output signals which can be summed to provide a command signal for the servocontroller means. From the embodiments disclosed, the programmable means may include a matrix board on which one or more programs can be set up. In the variations of the matrix board illustrated and described, the programs were provided by the selective positioning of settable pins. However, instead of this arrangement, cam or dial-in programmers may be employed.

Inasmuch as changes in the illustrative embodiments disclosed may occur to those skilled in the art without departing from the spirit of the present invention, the scope of the invention is to be determined by the appended claims.

What is claimed is:

1. In cyclically operated extrusion apparatus including a die head and pintle movable relative to each other to provide a variable orifice, servocontroller means responsive to an electrical command signal for effecting relative movement between said die head and pintle and means for forcing extrudable material through said orifice to form a parison the wall thickness of which is determined by the size of said orifice, wherein the improvement comprises means providing said command signal including means providing a continuously variable electrical signal related to the parison forming sequence of each cycle of operation, electronic interpolator means to provide a plurality of interpolator output electrical signals responsive to different portions of the total range of said variable signal, programmable means for selecting portions of said interpolator output signals to provide programmed output signals and means for summing said programmed output signals to provide said command signal.

2. Extrusion apparatus according to claim 1 wherein said electronic interpolator means comprises a plurality of electronic amplifier means having distributed biases to provide said interpolator output electrical signals.

3. Extrusion apparatus according to claim 2 wherein said biases are linearly distributed.

4. Extrusion apparatus according to claim 2 wherein said biases are nonlinearly distributed.

5. Extrusion apparatus according to claim 1 wherein said programmable means comprises a plurality of impedance strings severally receiving said interpolator output signals, each of said strings permitting one of said programmed output signals to be selectively determined.

6. Extrusion apparatus according to claim 1 further comprising an element which moves when said parison is forming, and said means for providing a continuously variable electrical signal is an electircal transducer responsive to movement of said element.

7. Extrusion apparatus according to claim 6 wherein said movable element is an acumulator piston.

8. Extrusion apparatus according to claim 6 wherein said movable element is a parison neck ring.

9. Extrusion apparatus according to claim 1 wherein said means for providing a continuously variable electrical signal is a ramp generator.

10. Extrusion apparatus according to claim 9 wherein said ramp generator includes an electronic integrator.

11. Extrusion apparatus according to claim 9 wherein said ramp generator includes an electromechanical integrator.

12. Extrusion apparatus according to claim 6 wherein said transducer comprises a potentiometer.

13. Extrusion apparatus according to claim 1 wherein said servocontroller means comprises an electrohydraulic servovalve and actuator.

14. Extrusion apparatus according to claim 2 further comprising settable gain means responsive to said continuously variable signal for adjusting the quantity of material extruded in a cycle of operation.

15. Extrusion apparatus according to claim 1 further comprising settable bias means operatively associated with said continuously variable signal for adjusting the occurrence of extrusion during a cycle of operation.

16. Extrusion apparatus according to claim 1 wherein said programmable means includes a plurality of impedance strings severally receiving said interpolator output signals, first shorting bar means, selectively movable first pins operatively associated with said impedance strings and said first shorting bar means for providing first programmed output signals, second shorting bar means and selectively movable second pins operatively associated with said impedance strings and said second shorting bar means for providing second programmed output signals, said summing means sums said first programmed output signals to provide said command signal for said servocontroller means, and further comprising second servocontroller means responsive to a second command signal for effecting relative movement between two parts utilized in the formation of a parison, and second means for summing said second programmed output signals to provide said second command signal.

17. Extrusion apparatus according to claim 16 wherein said two parts comprise another die head and pintle separate from the first mentioned die head and pintle.

18. Extrusion apparatus according to claim 16 wherein one of said parts is said die head and the other of said parts is a die thereon and movable relative thereto in a direction transverse to the direction of said relative movemant between said die head and pintle.

19. Extrusion apparatus according to claim 18 wherein said die is movable relative to said die head in another direction transverse to the direction of said relative movement between said die head and pintle, said programmable means includes third shorting bar means and selectively movable third pins operatively associated with said impedance strings and said third shorting bar means for providing third programmed output signals, and further comprising third servocontroller means responsive to a third command signal for effecting relative movement between said die and die head in said another direction, and third means for summing said third programmed output signals to provide said third command signal.

* * * * *